(12) United States Patent
Heaton et al.

(10) Patent No.: US 6,992,422 B2
(45) Date of Patent: Jan. 31, 2006

(54) POSITION SENSOR FOR A PIVOTING PLATFORM

(75) Inventors: Mark W. Heaton, Irving, TX (US); Arthur M. Turner, Allen, TX (US); Andrew S. Dewa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 11 days.

(21) Appl. No.: 10/458,995

(22) Filed: Jun. 11, 2003

(65) Prior Publication Data

US 2004/0251788 A1    Dec. 16, 2004

(51) Int. Cl.
    *H01L 41/08*    (2006.01)
(52) U.S. Cl. ...................................... 310/331; 310/311
(58) Field of Classification Search ................ 310/311, 310/328, 330–332
    See application file for complete search history.

(56) References Cited

U.S. PATENT DOCUMENTS

| | | | |
|---|---|---|---|
| 1,438,974 A * | 12/1922 | Wente | 324/97 |
| 5,049,775 A * | 9/1991 | Smits | 310/328 |
| 5,629,790 A | 5/1997 | Neukermans | |
| 6,100,524 A * | 8/2000 | Yagi et al. | 250/306 |
| 6,163,434 A * | 12/2000 | Zhang | 360/294.5 |
| 6,194,892 B1 | 2/2001 | Lin | |
| 6,259,548 B1 * | 7/2001 | Tsugai et al. | 359/224 |
| 6,295,154 B1 | 9/2001 | Laor et al. | |
| 6,379,510 B1 | 4/2002 | Kane et al. | |
| 6,441,359 B1 * | 8/2002 | Cozier et al. | 250/216 |
| 6,534,899 B1 * | 3/2003 | Takeuchi et al. | 310/323.17 |
| 6,643,045 B2 * | 11/2003 | Fujita et al. | 359/224 |
| 6,667,467 B2 * | 12/2003 | Shimizu et al. | 250/201.3 |
| 6,738,539 B2 * | 5/2004 | Hagood et al. | 385/16 |
| 6,761,420 B2 * | 7/2004 | Maluf et al. | 303/119.2 |

OTHER PUBLICATIONS

Piezo Systems, Inc., Introduction to Piezo Transducers, Piezo Systems—Piezo Actuators & Transducers, pp. 1-8, Internet, Cambridge, Massachusetts, USA.

* cited by examiner

*Primary Examiner*—Mark Budd
(74) *Attorney, Agent, or Firm*—William B. Kempler; W. James Brady, III; Frederick J. Telecky, Jr.

(57) ABSTRACT

A position sensor for a pivoting platform which has a first portion that flexes when the platform pivots and a second portion of the platform that is rigid, utilizes a piezoresistive element on the first portion of the platform. A connecting terminal for the piezoresistive element is on the second portion and thus not subject to the flexing stresses. The platform can have two symmetrical arms as the flexing portion, and a pair of piezoresistive elements can be formed on each of the arms in order to double the output voltage changes with changes in these positions of the platform. A temperature compensating piezoresistive element can be formed on the rigid portion of the platform and connected to the piezoresistive element or elements. The piezoresistive elements can be formed directly on the portions of the platform.

13 Claims, 2 Drawing Sheets

POSITION SENSOR FOR A PIVOTING PLATFORM

REFERENCE TO RELATED APPLICATIONS

This application is related to U.S. patent application Ser. No. 10/458,947 (TI-35911) entitled "Pivoting Platform Having A Piezoelectric Drive", commonly assigned and filed on even date herewith, which is incorporated herein by reference.

FIELD OF THE INVENTION

This application relates to a position sensor for a pivoting platform having a flexible portion and a rigid portion, and more specifically to a position sensor for a scanning platform.

BACKGROUND OF THE INVENTION

Micromirror devices for use, for example, in optical communications techniques and for optical matrix switches are known in the art. For example, apparatus useful for such communications links is known from U.S. Pat. No. 6,295,154, entitled "Optical Switching Apparatus", commonly assigned herewith and incorporated herein by reference. This patent discloses a micromirror assembly for directing a light beam in an optical switching apparatus. As disclosed in this patent, which reflects the light beam in a manner that may be precisely controlled by electrical signals, the micromirror assembly includes a silicon mirror capable of rotating in two axes. One or more small magnets are attached to the micromirror itself; a set of four coil drivers are arranged in quadrants, and are controlled to attract or repel the micromirror magnets as desired, to tilt the micromirror in the desired direction.

Micromachined mirrors for two-dimensional scanning at different rates suitable for television display are known, for example, in U.S. Pat. No. 5,629,790. The mirrors may be electrostatically or electromagnetically deflected and rely on the torsional forces in the flexible hinges to restore the mirror to its original position in a resonance scanning technique. The magnetic deflection technique uses a galvanometer type drive in which the coil is formed around the periphery of the mirror and a permanent magnet is provided external to the mirror. The mirrors operate at resonant frequency as shown in Table 1 and can be utilized along with modulated laser light to form television receiver images as a compact substitute for a cathode ray tube.

Copending application Ser. No. 09/957,476 which is commonly owned and which is incorporated herein by reference, provides a micromirror assembly that includes a package and method for making a package having a sensing capability for the position of the micromirror. This package and method is relatively low-cost, and well suited for high-volume production. The package is molded around a plurality of coil drivers, and their control wiring, for example by injection or transfer molding. A two-axis micromirror and magnet assembly is attached to a shelf overlying the coil drivers. Underlying the mirror is a sensor for sensing the angular position of the mirror. According to the preferred embodiment of the invention, the sensor includes a light-emitting diode and angularly spaced light sensors that can sense the intensity of light emitted by the diode and reflecting from the backside of the mirror. The position of the mirror can be derived from a comparison of the intensities sensed by the various angularly positioned light sensors.

It is desirable to have a very small mirror, on the order of 1 mm$^2$, which could be built into a compact package and used for scanning at a vertical scanning frequency of 50 or 60 Hz, for example. This scanning mirror could be used for the vertical deflection in the formation of a television picture, for example. The small dimensions of such a mirror do not provide the space for optical or capacitor sensing devices. Thus, there is a need for a new position sensing device which can be used for such small scanning mirrors, for example. This mirror would not utilize a resonance scanning frequency.

SUMMARY OF THE INVENTION

It is a general object of the present invention to provide a position sensor for a pivoting platform.

This and other objects and features are provided, in accordance with one aspect of the invention by a scanning platform comprising a platform coupled to pivoting means for pivoting the platform in a first and then a second direction, the platform being coupled to the pivoting means by a pair of flexible arms on the platform. A piezoelectric element is formed on at least one of the flexible arms.

Another aspect of the invention includes a position sensor for a pivoting platform having a first portion of the platform that flexes when the platform pivots and a second portion of the platform that is rigid. A piezoresistive element is on the first portion of the platform. A connecting terminal for the piezoresistive element is on the second portion and connected to the piezoresistive element.

A further aspect of the invention comprises a method for measuring the position of a pivoting platform. The change in resistance of a piezoresistive element on a flexible portion of the platform is measured. The change in resistance is converted to a position measurement.

DETAILED DESCRIPTION OF THE PRESENT INVENTION

Copending applications Ser. No. 10/458,947 (TI-35911) describes a pivoting platform which may be utilized for a scanning mirror, for example. The present invention is described in connection with this structure as one embodiment thereof. The present invention can be applied to other pivoting or rotating platforms in which at least one element is flexed during the pivoting or rotation. Therefore, the following description should not be taken as limiting the scope of the present invention.

Figure 1A:
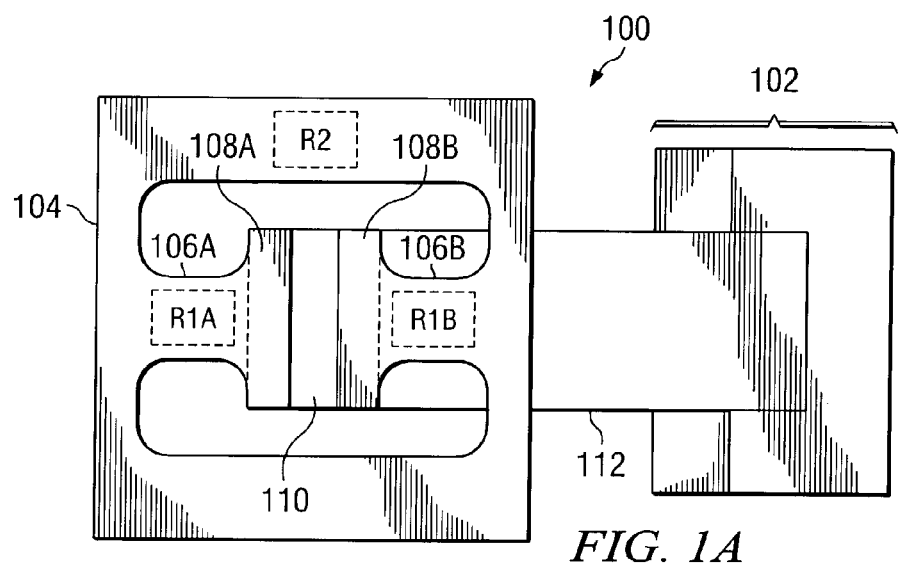
FIG. 1A corresponds to FIG. 1A of copending application Ser. No. 10/458,947 (TI-35911) incorporating the present invention.
Figure 1B:
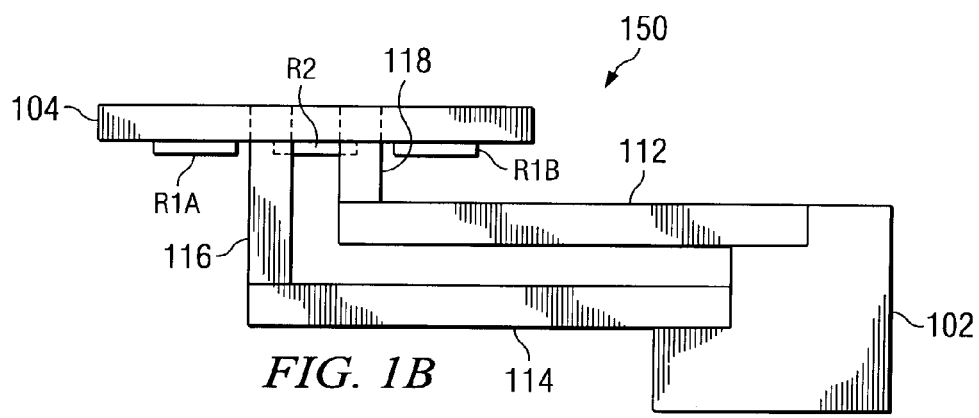
FIG. 1B is a side view thereof.

FIG. 1A shows a plan view of a pivoting platform generally shown as 100. A support 102 has attached thereto two piezoelectric elements 112 and 114 (not seen in FIG. 1A) in which the element 112 is above element 114. Referring to FIG. 1B, a side view of FIG. 1A is shown generally as 150. In the side view, it can be seen that element 112 and element 114 are physically located one above the other and are attached to the support at set portions of the support. Each of the elements 112, 114 can be the same length, but this is not required. The piezoelectric elements 112, 114 are made from a piezoelectric material known in art, which is a two-layer element that produces curvature when one layer expands while the other layer contracts. These devices, sometimes referred to as "benders", reduce this curvature when an appropriate electric voltage is applied thereto. Piezoceramic elements possessing these properties are available through Piezo Systems Incorporated, for example. The type of piezoelectric device that is chosen for elements 112, 114 is a design choice and not critical to the present invention.

Platform 104 is attached to the two piezoelectric elements 112, 114 via spacers 116, 118, respectively, in order to align the motion point associated with the piezoelectric elements. These spacers are attached to two arms 106A and 106B, best shown in FIG. 1A, of the platform 104. The arms are designed to flex in response to motion from the piezoelectric elements 112, 114, respectively. As shown in FIG. 1A, there is a space surrounding each of the arms which are thinner in width at the flexing area and the width of the spacers at the attachments points 108A and 108B, respectively. It is desirable that the attachment points 108A and 108B are relatively rigid with respect to the arms 106A and 106B and they are made more rigid by being attached to the rigid spacers 116, 118. Reference numeral 110 shown in FIG. 1A is not an element of the platform 104 and the sections 108A and 108B are not, in fact, attached. In looking down on platform 104, one sees the piezoelectric element 114, which happens to be the same width as the elements 108A and 108B, thereby giving the impression in the drawings that these are connected, when in fact they are not. If the element 104 was viewed by itself, the element 110 would be part of the space surrounding the elements 106A and 106B, 109 and 111.

Spacers 116 and 118 have no electrical properties in the present invention and can be made from any relatively stiff material such as aluminum or ceramic. It is desired that these materials be stiff enough as to not bend when force is applied by piezoelectric elements 112 and 114 as discussed below. The spacers 116 and 118 are to transmit this force to the arms 106A and 106B at the attachment points 108A and 108B, respectively. The spacers may be attached to the piezoelectric elements 112, 114 and the platform 104 at attachment points 108A and 108B utilizing a suitable epoxy, for example. Other suitable attachment methods may also be used.

In addition, three piezoresistive elements R1A, R1B and R2 are on the platform 104. These piezoresistive elements can be formed on the platform or be separate elements that are attached thereto. Furthermore, although piezoresistive elements are discussed herein, other similar devices which change resistance with strain, can likewise be used. The three piezoresistive elements are preferably placed on the underside of the platform to facilitate electrical connection where the spacer 116 interfaces with flexible arm 306A (FIG. 3), and are thus shown in dashed lines in FIG. 1A. This is more easily seen from FIG. 1B which is a side view of the apparatus of FIG. 1A.

The connection of the three piezoresistive elements is shown more clearly in FIG. 3 and discussed below. When the platform 104 is made to pivot around an imaginary axis (not shown), arms 106A and 106B are stressed and the resistances of the resistors R1A and R1B change. This change in resistance can be utilized to measure the position of the platform 104.

Figure 2A:
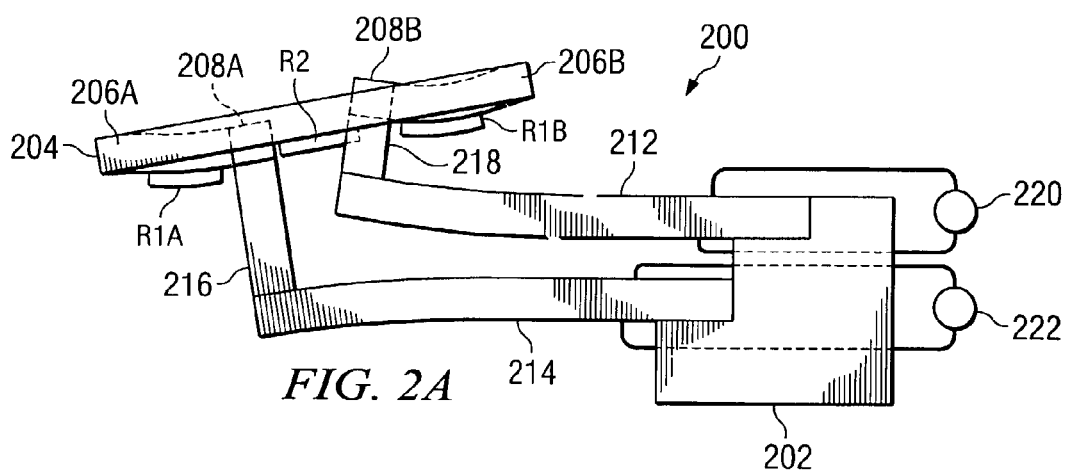
FIGS. 2A and 2B correspond to 2A and 2B of copending application Ser. No. 10/458,947 (TI-35911) incorporating the present invention and illustrating the operation of the present invention on that structure.
Figure 2B:
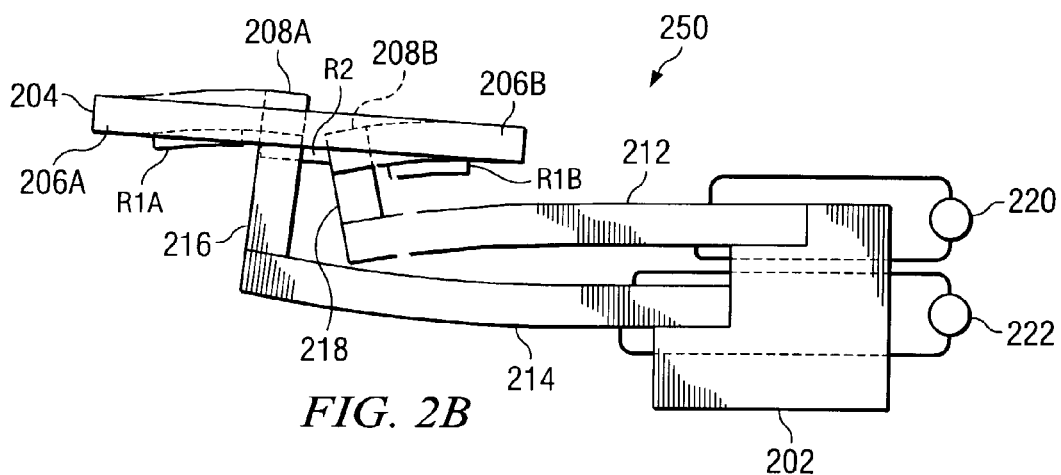

FIG. 1B shows the device 150 in its neutral position. FIGS. 2A and 2B show the platform 104 turned clockwise and counterclockwise, respectively. The elements in FIGS. 2A and 2B have similar reference numerals to the corresponding elements in FIGS. 1A and 1B. The movement of the platform is such that it appears that the platform is pivoting about an imaginary axis (not shown) to produce a partial rotation about the imaginary axis.

FIG. 2A shows the platform 204 pivoting in the counterclockwise direction. In order for this to occur, an electrical signal is applied to the piezoelectric elements 212, 214, respectively. In FIG. 2A, two voltage signal sources 220 and 222 are shown connected to the piezoelectric elements 212 and 214, respectively. The voltage and polarity of the electrical signal depends on a particular piezoelectric material chosen for the elements 212 and 214 and the way they are mounted. As shown in FIG. 2A, the elements 212 and 214 are wired such that element 212 bends in the clockwise direction, up in the figure, and element 214 bends in a counterclockwise direction, down in the figure. This can be accomplished in several ways. One is to mount element 214 opposite that of element 212. The other is to wire the devices such that the polarity applied to element 212 is opposite that of applied to element 214, and a third possibility is applying signals of opposite polarity to each of the devices. In FIG. 2A, a single source 220 or 222 could be wired to both piezoelectric elements 212, 214. If the two piezoelectric elements are mounted to bend in opposite directions with the same voltage applied, then they will both be wired identically. If they are mounted to bend in the same direction with the same voltage applied, they will be wired oppositely. Alternately, they could each be wired to a separate supply or signal source 220 or 222 as illustrated in FIG. 2A. As shown in FIG. 2A, the force applied by piezoelectric element 212 is conveyed by spacer 218 to the attachment point 208B of flexible arm 206B. This causes the arm to bend upward at the end 208B forming a more or less concave curve at the top of the arm 206B. Conversely, element 214 pulls connection point 208A down via spacer 216 to cause the arm 206A to bend downward. It should be noted that the arm and attachment 206A, 208A bend below the surface of the platform 204 whereas a portion of the arm 206B and/or attachment point 208B bends above the surface of the platform 204, as shown in FIG. 2A. The forces are applied to the flexible arms to provide the flexibility needed to turn the upward and downward curved motion of the elements 212, 214, respectively, into a pivoting of platform 204 without the need for pivotable joints where the spacers 216, 218 are attached to the platform. This allows the device to be simple in construction and compact, as well as mechanically less complex.

FIG. 2B shows a side view of the device shown in FIG. 2A generally as 250. The construction is the same as found in FIGS. 2A and 1B but the platform 204 is pivoted in the clockwise direction. In this case, the voltage applied to these electric elements 212 and 214 is reversed, utilizing circuitry well know in the art, to cause the elements to bend in the opposite direction from that shown in FIG. 2A. Accordingly, element 212 bends in the downward direction and element 214 bends in the upward direction. Element 212 pulls attachment point 208B down via spacer 218 causing flexible arm 206B to bend downwardly forming a more or less concave curve at the bottom of the arm. Conversely, piezoelectric element 214 bends upwardly pushing point 208 up via spacer 216 to cause arm 206A to deflect upwardly as shown in FIG. 2B. This causes the mirror to pivot in the opposite direction from FIG. 2A and causes arm 206A and attachment point 208A to protrude from the top of the platform 204 and the attachment point 208B and a portion of the arm 206B to protrude from the bottom of the platform 204.

The counterclockwise pivoting of the platform 204 shown in FIG. 2A produces tension in each of the piezoresistive elements R1A and R1B which change in resistance is a measure of the magnitude and direction of the pivoting of the platform. Conversely, the clockwise rotation of the platform as shown in FIG. 2B, produces compression in the piezoresistive elements R1A and R1B, which produces the opposite change in resistance as the measure of the magnitude and direction of the rotation of the platform. A circuit useful to this measurement is shown and explained with respect to FIG. 4.

Figure 3:
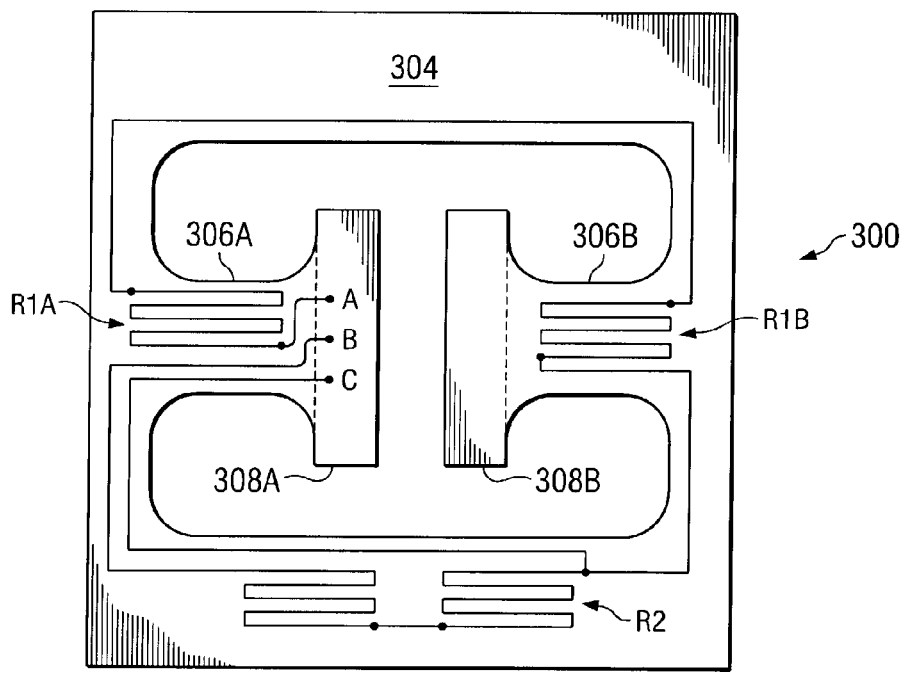
FIG. 3 is a detailed plan view of the platform 104 of FIG. 1 showing the piezoresistive elements formed on the platform.

FIG. 3 shows a bottom view of the platform 304 which corresponds to the platform 104 and FIG. 1A, generally as 300. In FIG. 3 the piezoresistive elements R1A, R1B and R2 are shown formed on the substrate. The substrate is preferably silicon, the micromachining of which is well known to produce the structure for the platform 304 as shown in FIG. 3 and described in more detail in the copending application Ser. No. 10/458,947 (TI-35911). As is well know to those skilled in the art, piezoresistive elements can be formed on silicon by depositing polysilicon on the silicon wafer and appropriately doping the deposited polysilicon material, for example.

As shown in FIG. 3, the three resistive elements are connected in series. Since the bending of arms 306A and 306B both either place the piezoresistive elements R1A and R1B in tension or compression, together, utilizing two piezoresistive elements in series doubles the output voltage for each change in position, which makes it easier to detect the change in position. However, it should be noted that a single piezoresistive element could be utilized, although a lower output voltage change would be detected. The formation of the three piezoresistive elements on the silicon wafer that forms the platform 304 does not increase the cost of making the device over the formation of a single piezoresistive element thereon, and is therefore provides a no cost way to increase the output voltage change and thus make the position determination easier.

Elements 306A and 306B are designed to provide the appropriate amount of flex in order to accommodate the upward and downward movement of the spacers 216 and 218 and convert that motion to a pivoting action for the platform 204, 304. This is accomplished by adjusting the length, with and possibly the thickness of the arms 306A and 306B. Conversely sections 308A and 308B are designed to be as rigid as possible. They are made more rigid by being the connecting points for mounting the arms to the spacers 216, 218, respectively. Contacts A, B and C are formed on one of the rigid sections, here section 308A. This allows connections to be made to the position detecting circuitry by means of soldering wires to the contacts A, B and C where the contacts will not be flexing, and thus the wiring and solder joints not be subjected to breakage due to the flexing of the connection points.

Figure 4:
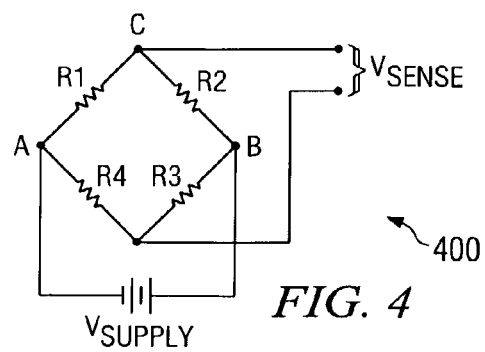
FIG. 4 is a schematic diagram of a position sensing circuit for use with the present invention.

FIG. 4 shows a circuit useful in obtaining a voltage which is related to the position of the platform 304, generally as 400. FIG. 4 is a Wheatstone bridge comprising of four resistors R1, R2, R3 and R4. Resistors R3 and R4 are fixed resistors within the circuit. Resistor R2 is the resistor R2 formed on platform 304 and resistor R1 is the series connection of resistors R1A and R1B. The terminals A, B and C of FIG. 3 show the connection of piezoresistive elements in FIG. 3 to the Wheatstone bridge of FIG. 4. As shown in FIG. 4, all resistors R1, R2, R3 and R4 are of the same value. A voltage supply, such as battery $V_{supply}$, is applied across terminals A and B, as is well known. The output of $V_{sense}$ is taken from point C and the junction of the resistors R3 and R4. By connection resistors R1A and R1B in series, the output of voltage change in connection with the flexing of the arms 306A and 306B is doubled, thus making for a greater change in the voltage $V_{sense}$. Resistor R2 is placed on a portion of the platform 304 that does not flex. Therefore, its value does not change with the motion of the platform 304, but does change with changes in temperature. Resistors R1A and R1B change both with respect to the flexing of the arms 306A and 306B and with temperature. Thus, resistor R2 serves as a temperature compensating resistor, at no additional cost. As is known to those skilled in the art, the output voltage to this circuit is:

$$V_{sense} = \frac{\Delta R_1}{4R} V_{supply}$$

where $R_1$ (normal)=$R_2$=$R_3$=$R_4$

If this structure of platform 304 was such that one arm was placed in tension while the other was placed in compression, the output voltage provided by the circuit of FIG. 4 would not change, because the resistance would change the same amount in opposite directions. According, if two piezoresistive elements are utilized, they would be applied as inputs to a differential amplifier (not shown), as is well known, so that the opposite changing voltages resulting from the oppositely changing resistance values will each cause the output voltage to swing in the same direction.

The output voltage $V_{sense}$ can be used to determine the position of the platform. In applications where the platform is utilized to pivot a mirror which scans a modular light beam to produce a television picture, for example, this allows the motion of the mirror to be synchronized with television picture. If the mirror were being utilized for the vertical deflection of the picture, the mirror motion could be synchronized with the vertical synchronization pulse of the television picture. Furthermore, the output voltage will change linearly with change in position, which allows this to be utilized in a feedback circuit to linearize the motion of the platform so as to avoid distortion of the picture over times or with respect to temperature, for example.

While the invention has been shown and described with reference to preferred embodiments thereof, it is well understood by those skilled in the art that various changes and modifications can be made in the invention without departing from the spirit and scope of the invention as defined by the appended claims.

What is claimed is:

1. A scanning platform comprising
a platform coupled to pivoting means for pivoting the platform in a first and then a second direction, the platform being coupled to the pivoting means by a pair of flexible arms on the platform;
piezoresistive elements formed on both flexible arms; and wherein a temperature compensating piezoresistive element is formed on an area of the platform outside of the flexible arms, the temperature compensating piezoresistive element being connected in series with the piezoresistive element formed on the flexible arms.

2. The scanning platform of claim 1 wherein the platform is formed as a unitary structure.

3. The scanning platform of claim 2 wherein the platform and the flexible arms are formed from a silicon wafer.

4. The scanning platform of claim 3 wherein the silicon wafer is etched to form inwardly facing flexible arms having an opening surrounding each arm on 3 sides.

5. The scanning platform of claim 4 wherein the flexible arms have a rigid area for attachment of the flexible arms to the pivoting means and wherein terminals are formed in the rigid area for connecting the piezoresistive element to a measuring circuit.

6. The scanning platform of claim 5 wherein the measuring circuit is a Wheatstone bridge.

7. The scanning platform of 1 wherein the pivoting means comprises a first piezoelectric element bending in a first direction in response to an electrical signal applied thereto and a second piezoelectric element which bends in a second direction in response to an electrical signal applied thereto.

8. The scanning platform of claim 1 further comprising a mirror attached to the platform.

9. A position sensor for a pivoting platform having a first portion of the platform that flexes when the platform pivots and a second portion of the platform that is rigid, the position sensor comprising:
   a piezoresistive element on the first portion of the platform which comprises two flexible arms and wherein a piezoresistive element is formed on each arm;
   a connecting terminal for the piezoresistive element on the second portion and connected to the piezoresistive element; and
   further comprising a temperature compensating piezoresistive element formed outside the first and second portions on a non-flexing portion of the platform and connected in circuit with the piezoresistive elements on each arm.

10. The position sensor of claim 9 wherein wiring connecting the piezoresistive element to the connecting terminal is formed on the first portion of the platform.

11. The position sensor of claim 9 further comprising a mirror attached to the platform.

12. A method for measuring the position of a pivoting platform comprising:
   measuring the change in resistance of a piezoresistive element on a flexible portion of the platform;
   converting the change in resistance to a position measurement; and
   wherein the measurement is temperature compensated by a piezoresistive element on a non-flexing portion of the platform.

13. A method for measuring the position of a pivoting platform comprising:
   measuring the change in resistance of a piezoresistive element on a flexible portion of the platform;
   converting the change in resistance to a position measurement wherein measuring the change in resistance measures the change in resistance of two piezoresistive elements on two flexible portions of the platform connected in series and
   wherein the measurement is temperature compensated by a piezoresistive elements on a non-flexing portion of the platform.

* * * * *